(12) United States Patent
Cohen et al.

(10) Patent No.: US 9,448,961 B1
(45) Date of Patent: Sep. 20, 2016

(54) PRIORITIZED DOWNLOAD OF SOCIAL NETWORK CONTENT

(71) Applicant: Google Inc., Mountain View, CA (US)

(72) Inventors: Gabriel A. Cohen, Alameda, CA (US); Daniel Lehmann, San Francisco, CA (US); Dmitri Plotnikov, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 680 days.

(21) Appl. No.: 13/655,143

(22) Filed: Oct. 18, 2012

Related U.S. Application Data

(60) Provisional application No. 61/548,709, filed on Oct. 18, 2011.

(51) Int. Cl.
*G06F 15/16* (2006.01)
*G06F 17/30* (2006.01)
*H04L 29/08* (2006.01)

(52) U.S. Cl.
CPC ............... *G06F 15/16* (2013.01); *H04L 67/28* (2013.01); *G06F 17/30* (2013.01)

(58) Field of Classification Search
CPC .................. H04L 67/2842; H04L 67/2847
See application file for complete search history.

(56) References Cited

U.S. PATENT DOCUMENTS

| | | | |
|---|---|---|---|
| 6,085,226 A * | 7/2000 | Horvitz | G06F 17/30902 707/E17.12 |
| 7,912,458 B2 * | 3/2011 | Ramer et al. | 455/418 |
| 8,423,459 B1 | 4/2013 | Green et al. | |
| 8,462,665 B2 | 6/2013 | Tabbara et al. | |
| 8,539,040 B2 | 9/2013 | Luna et al. | |
| 8,554,192 B2 | 10/2013 | Ramer et al. | |
| 8,571,999 B2 | 10/2013 | Crawford | |
| 8,700,622 B2 | 4/2014 | Fay et al. | |
| 8,725,851 B2 | 5/2014 | Kiley et al. | |
| 2003/0051245 A1 * | 3/2003 | Klopfenstein | 725/46 |
| 2008/0097822 A1 * | 4/2008 | Schigel | G06Q 10/063 705/7.33 |
| 2008/0242279 A1 * | 10/2008 | Ramer et al. | 455/414.2 |
| 2009/0234876 A1 * | 9/2009 | Schigel | G06F 17/30873 |
| 2011/0078584 A1 * | 3/2011 | Winterstein et al. | 715/751 |
| 2011/0137169 A1 * | 6/2011 | Akaki et al. | 600/443 |
| 2011/0282942 A1 | 11/2011 | Berger et al. | |
| 2012/0303644 A1 | 11/2012 | Martin, Jr. et al. | |
| 2013/0262575 A1 | 10/2013 | Xiong et al. | |
| 2014/0108536 A1 | 4/2014 | Crawford | |

FOREIGN PATENT DOCUMENTS

WO     2013/184947     12/2013

* cited by examiner

*Primary Examiner* — Kevin Bates
*Assistant Examiner* — Jeyanath Jeyaratnam
(74) *Attorney, Agent, or Firm* — Fish & Richardson P.C.

(57) ABSTRACT

A computer-implemented method includes identifying, with a computer system that has a network interface, one or more primary categories of content from a social networking system that are of primary relevance to a user of a computing device, as compared to one or more secondary categories of content from the social networking system that are of lower importance to the user of the computing device; causing content from the primary categories to be downloaded from the social networking system to the computing device automatically and without user interaction with a social networking application that is arranged to display the downloaded content; and causing content from the secondary categories to be downloaded from the social networking system to the computing device separately from the content from the primary categories, and in response to a defined user interaction with a social networking application that corresponds to the social networking system.

23 Claims, 6 Drawing Sheets

PRIORITIZED DOWNLOAD OF SOCIAL NETWORK CONTENT

CROSS-REFERENCE TO RELATED APPLICATIONS

This application claims the benefit of priority Under 35 U.S.C. §119(e) of U.S. Provisional Application Ser. No. 61/548,709, filed on Oct. 18, 2011. The entire contents of which is incorporated herein by reference.

BACKGROUND

People like to communicate with each other; it is natural to share one's own thoughts, and it is entertaining and informative to learn from others. Individuals generally communicate most with their own closest real-world friends and colleagues, and sometimes with those friends and colleagues' own contacts. Individuals often also share other information with one other, such as digital photographs of children and events, gossip, practical tips, jokes, political opinion, etc.

The sharing of each of these types of information has been made easier in recent years due to the emergence of online social networks, which are online communities through which a registered user may form virtual relationships with other registered users (often only after both registered users agree) and then submit information that can be viewed by his/her respective acquaintances (and perhaps others). For example, a user can compose a social network post about his/her current activities or feelings, and that information may be displayed when that individual's social network contacts/friends access their own accounts on the social network. On some social networks, a user can "check in" at a venue (such as a bar or restaurant) to indicate to that user's social network contacts the presence of that user at the venue. Alternatively, a user may take a photograph with a smartphone and then post it to his/her social network profile. When social network contacts of the user log into the social network (such as by activating an application on a smartphone for reviewing content from the social network), they can often see such activity and/or content posted by their social network contacts, including the user.

SUMMARY

This document discusses systems and techniques that can be used to manage the downloading of content from a social network so as to conserve resources associated with a user device that accesses the social network. Examples of such resources include device battery life and bandwidth available to the device as part of a network access account of the user (e.g., a "data plan"). In particular, certain content posted on the social network may be deemed to have primary importance to the user, and other content may be deemed to have secondary importance. In some instances, one or more additional lower levels of importance may be defined by the user.

In some embodiments, the content determined to be of primary importance may be pre-downloaded to a user device (e.g., smartphone) without the user having explicitly requested that content. For example, the device may download content of primary importance when the device is in a sleep mode, when a social-networking application installed/executing at the device is not the current focus of an operating system installed at the device, and/or when the social-networking application is activated, initiated, or "opened". Such content may include large digital images (in terms of file size), such as images posted by close friends of the user, or images that are tagged with metadata including the user's name. Alternatively, images of secondary importance may not be downloaded automatically by the device/social-networking application or may be downloaded initially only as thumbnail-sized images. Examples of primary content include content posted to the user's own profile, content posted by members of the social network (e.g., friends and/or other individuals followed by the user) whom the user has identified as favorites, and/or content posted by members of the social network whose profile and/or content the user has most-frequently accessed content in the past. In the latter case, this frequency can also be weighted more heavily toward more recent accesses by the user. For example, the posted content of a friend can be determined to be primary if the user has accessed that friend's content in the last week (or other specified time period), as opposed to the content posted by another, friend of secondary importance whose posted content was accessed frequently by the user in the past (e.g., a year ago) but not as frequently in the more-recent past.

According to one general implementation, a computer-implemented method includes analyzing types of content, the content being associated with a social network system and having been previously accessed by a user, to identify one or more types of preferred content to correlate with selections by the user; processing a request for delivery of new content to a computing device associated with the user, the request being sent not in response to an explicit user request for the new content; identifying preferred content recently submitted to the social network system that that matches the one or more types of preferred content identified as correlating with selections by the user, in distinction to non-preferred content that does not match the one or more types of preferred content, the preferred content being accessible to the user and generated by at least one contact of the user or a service of the social network system from which the user is currently established to receive content; and causing the preferred content to be downloaded from the social network system to the computing device automatically and without user interaction with a social networking application, without causing the non-preferred content to be downloaded.

In another implementation, a computer-implemented method includes identifying, with a computer system that has a network interface, one or more primary categories of content from a social networking system that are of primary relevance to a user of a computing device, as compared to one or more secondary categories of content from the social networking system that are of lower importance to the user of the computing device; causing content from the primary categories to be downloaded from the social networking system to the computing device automatically and without user interaction with a social networking application that is arranged to display the downloaded content; and causing content from the secondary categories to be downloaded from the social networking system to the computing device separately from the content from the primary categories, and in response to a defined user interaction with a social networking application that corresponds to the social networking system.

In another implementation, a computer-implemented system includes a social network activity analyzer arranged to identify types of content on a social network that are of primary interest to a first user of the social network; one or more electronic storage media storing data that represents posts made by users of the social network, including posts that are available to the first user; and a download manager programmed to automatically cause download to a user computing device of content, without explicit user request for the content, from posts that are identified as corresponding to the one or more types of content that are of primary interest to the first user, separately from content in categories that are of secondary interest to the first user.

Certain implementations may provide one or more of the following advantages. By downloading prioritized content when one or more conditions are met on a mobile device (e.g., the device being connected to an external power source, the device having at least a threshold battery charge, the device being connected to a non-fee based network (e.g., a WiFi network), processors for the device having available processing capacity, the device being in a sleep or hibernate mode), the mobile computing device can more efficiently use available resources so as to provide content to users of the device. This can allow a mobile computing device to minimize the strain on processing resources, power resources, network resources, and/or a user's financial resources when providing content on the mobile computing device. Overall disk space utilization, radio transmissions, battery usage, and/or metered mobile data consumption can be reduced by precaching priority content to a mobile computing device.

Additionally, users can experience improved performance when accessing social network content based on prioritized content already having been downloaded on the mobile computing device. There can be lower latency for users in viewing priority content (e.g., users do not have to wait for the prioritized content to download), which can additionally allow for the secondary content to be downloaded to the device more quickly. Furthermore, prioritized downloading of content can allow users to access social network content offline.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
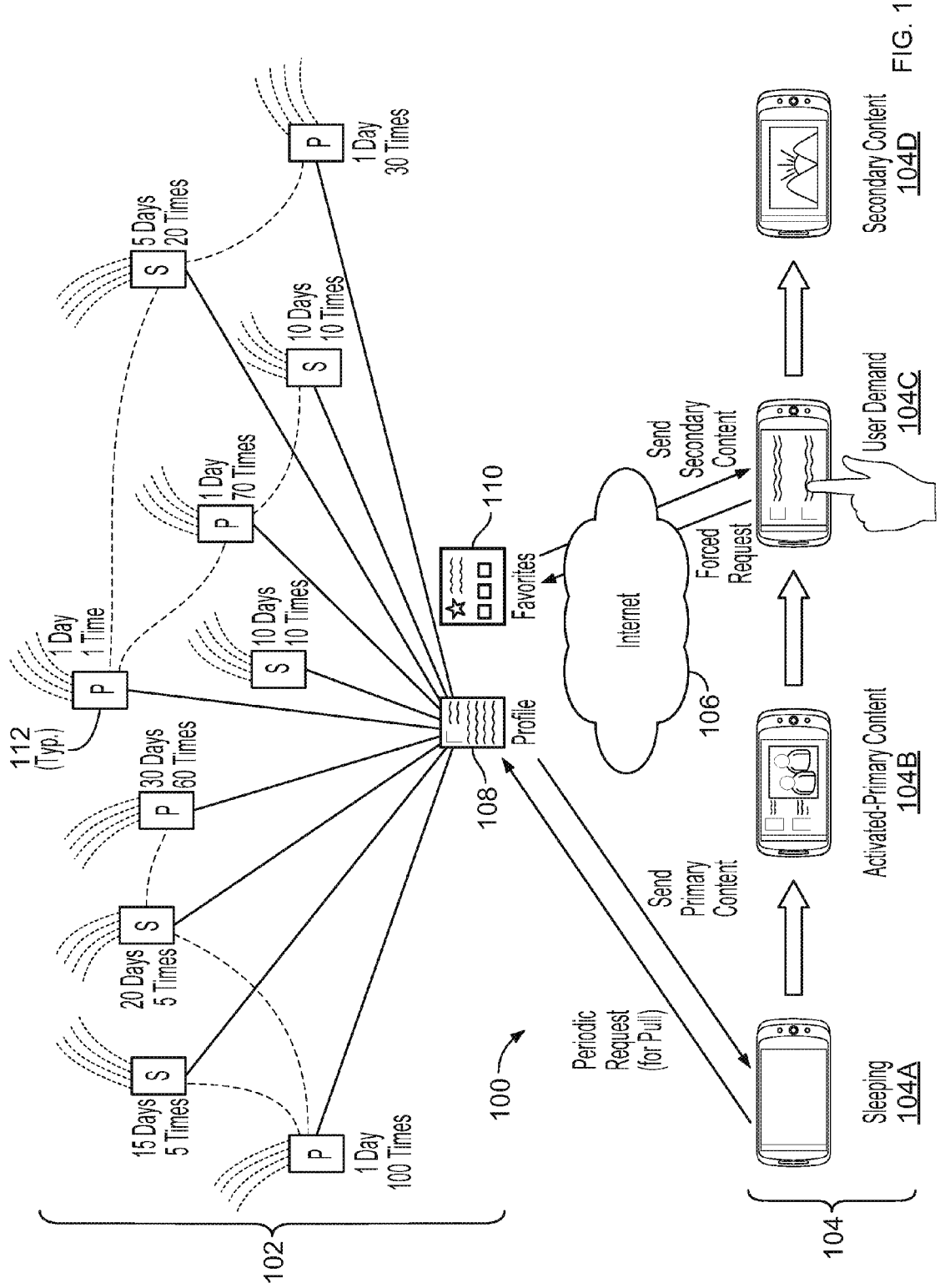
FIG. 1 is a conceptual diagram of a system and process for prioritized download of content from a social network.

This written description discusses techniques for prioritizing types of information that are to be downloaded from a social networking system to a computing device such as a smartphone. Such prioritization may be beneficial in limiting the amount of information that is automatically downloaded to the device, so as to limit battery usage by a device and/or network bandwidth consumed by the device. At the same time, a user may still obtain better performance from a system because he/she can review social-networking content that is deemed to be important to him/her without having to wait for such content to download upon request. Also, in certain circumstances, such content can be reviewed even when the user device has lost its network connection, given that the content has been already been downloaded (e.g., automatically).

In examples discussed herein, the interaction by members of a social network in requesting content from the social network may be used to determine the type(s) of content that each of the users is most likely to request in the future. For example, if a user frequently clicks on digital photographs posted/submitted by a particular subset of his or her acquaintances, the system may infer that the same user will click on digital photographs from those same acquaintances in the future. As such, the system may, when the user is not currently interacting with the social-networking application, automatically download full-size digital images posted by such acquaintances—such that the full-size images are available for display in direct response to a user request, without imposition of a download delay.

The identification of what types of information are more important to a user (termed "primary content" in this description, in contrast to secondary content that is less important and downloaded separately from the primary content), can be made by a variety of components in the system. For example, a social-networking application on the computing device may make such a determination, and may request primary content automatically from a social-networking server system. Alternatively, a service of the operating system on the device may make such requests independently of any particular application, and it may make the content that that it downloads available to various applications on the device. In yet another implementation, a social-networking server system may make such determinations and may periodically download the information or content to the device, either by pushing the content to the device, or by sending a message to the device to induce the device to request such content.

Secondary content may be downloaded in various normal manners in response to particular explicit requests by a user. For example, a user may click on a thumbnail image for an acquaintance who is not a primary acquaintance, where the thumbnail was downloaded along with other primary content. In response, a full-size version of the image may be requested from the social network server system, so that the user will experience noticeable latency as the full-size image is obtained (since the full-size image, as part of a group of secondary content, was not pre-downloaded).

FIG. 1 is a conceptual diagram of a system 100 and process for prioritized download of content from a social network. In general, the system 100 shows a mobile device 104 in a chronological sequence of states, obtaining information from a social network 102 through the Internet 106. The social network 102 is shown in the form of a graph in which particular users are represented as nodes indicated by rectangles, and social connections between users are shown by edges between the nodes in the graph. A node 108 is represented for a particular user who is registered with the device 104, such as by having logged onto the social network 102 using the device 104. (Dashed lines show connections between the users and other users who are not shown here, and may be termed to be friends-of-friends of the particular user.)

Different nodes in the graph are labeled in different manners, as shown here to indicate whether they contain or correspond to primary content or secondary content. The determination of whether a node is primary or secondary may be repeated over time, and the classification for a node or other item may thus change over time. Other content may always be primary. For example, node 108 includes content of a profile for the particular user, and may be always considered to be primary information. Node 110 represents the favorites that the particular user may have explicitly identified as being favorite other users or other objects within the social network 102. For example, a user may follow a particular brand or company, and may indicate that it is one of the user's favorites. Such content associated with favorites may be assumed to have particular relevance to the user, and may thus be identified as being primary content. Of course, the content to which the favorites 110 point may change as a user identifies additional favorites, or deletes certain favorites over time.

Node 112 and other similar nodes represent other members of the social network 102. Those other members may include human users that are friends of the particular user at node 108, and may also include companies, movies, television programs, or other entities that the user at node 108 follows. Adjacent to each of the other nodes is text that indicates how many days have passed since the first user (at node 108) last made an affirmative act to access content from that other node, and how many times in a previous defined period, such as the previous month, the user has accessed content corresponding to the node.

Particular ones of the nodes in this example are shown labeled to indicate whether they have been determined to be associated with primary content or secondary content, or to be primary nodes or secondary nodes, respectively. For example, node 112 has been labeled with a "P" to indicate that it is a primary node, because although content from that user has been accessed only one time, the content was accessed very recently—one day ago. In contrast, the two nodes that are located closest to the node 108 in the figures are labeled with an "S," to indicate that they are secondary, because they have only been accessed 10 times in the relevant period and have not been accessed for 10 days, both of which places them below cutoffs for each of the two factors (time since last user request, and frequency of user requests) for identifying a node as being primary for the first user.

As can be understood, the status of particular items as being primary or secondary will vary for different users. For example, assume users A and B are both friends in the system 100 with user C. If user A frequently accesses content form user C, and user B infrequently accesses the same content, user C may be primary vis-à-vis user A, and secondary vis-à-vis user B. Certain other content may be considered primary for all users, such as important system messages from an operator of the social network 102.

Referring now more specifically to the states 104A-D of the mobile device 104 at the bottom of the figure, a sleeping state 104A is indicated at the left of the figure. In such a state, the device 104 may have certain functionality disabled in order to save battery power, such as by turning off a display on the device104, and slowing the clock rate of processors on the device104. Other functionality may still be in force, such as functionality for generating a timed alarm on the device 104, and functionality for receiving incoming telephone calls on the device 104. In such a mode, the device 104 may make periodic requests for content from the social network 102 system. For example, a social networking application, or a service offered by an operating system on the device 104, may at determined periods make requests of the social network 102 system for primary content, so that such content will be available to a user of the device 104 as soon as the user activates a social networking application on the device. The social network 102 system may then return such primary content, where it may be stored on the device 104 until the user activates such an application.

Such primary content may include all or substantially all content from items in the social network 102 that are determined to be primary (and not already downloaded to the device 104), such as the textual posts onto node 108 user profile, and full-resolution digital images on the profile 108 or primary nodes such as node 112. The primary content may also include content that has low bandwidth or battery costs from other nodes or areas of the social network 102, e.g., from secondary items. For example, simple text or thumbnail images for secondary nodes or users on the social network 102 may be provided to the device 104 because, even though it is from a secondary source, it can be treated as primary because its "cost" (in terms of battery life and bandwidth) is so small.

At state 104B, the user has activated a social networking application on the device104, and the device 104 is able to immediately show primary content that was previously downloaded to the device 104. As a result, the user may be able to perform his or her normal browsing of the social network content, while staying within the bounds of the primary content, and may thus not experience any latency caused by a need to download secondary content.

However, at some point, such as at state 104C, the user seeks content that was not part of the previously downloaded primary content that has been stored on the device 104 and that is immediately available to a user who stays within their traditional browsing patterns. Such an out-of-norm selection by the user creates a forced request to the social network 102 system through the Internet 106. The forced request is to be distinguished from an automatic request that occurs without any action by the user indicating a need to receive particular content, such as the automatic downloading of content to the device at state 104A. Separately, an arrow shows secondary content being downloaded to the device 104 as a result of the forced request, and at state 104D, such secondary content is displayed to the user.

In one example, the user demand at state 104C may include the user selecting a previously-downloaded thumbnail image posted by a friend at a secondary node in the social network 102. Because such a friend was at a secondary node, the full-size image may not have been previously downloaded during state 104A, so that the subsequent user demand for such content may generate a request back to the social network system 102 because the full-size image was not pre-downloaded.

The various actions described here may also be supplemented or altered in various manners. For example, before a demand is determined to be "forced" and require a request to a server system, the demand or request may first be checked against the local storage on the device 104 to determine whether the requested content has already been downloaded. If the check is negative so that the requested content is not currently being stored on the device 104, the content request may be forwarded to the social network 102 system so as to obtain the content in a normal manner.

Such content management may, as indicated, be managed by a contacts manager or similar service provided by an operating system on the device 104. For example, various applications on a device 104 may seek content from the social network 102. As one example, an electronic mail application may display recent social network posts in conjunction with displayed e-mails from corresponding members of the social network. Other applications may aggregate posts from multiple social networks into a single interleaved display in a familiar manner. Such functionality may be best performed by having a single service that is part of the operating system for the device gather the social network content, and then serve such content to the various applications in a controlled manner according to an application programming interface (API). Thus, an application may simply request content from the service, and if the content has already been downloaded, it may be provided immediately to the application, whereas if the content is secondary and has not previously been downloaded, the service may downloaded it from the social network 102 system (though with download latency).

In certain implementations, a check may be made, before determining whether to limit the amount of social network content to be downloaded, of whether the device 104 needs such limits. For example, if the device 104 is determined to be operating from AC power and is connected to a network that does not have bandwidth limits (e.g., a home WiFi network), then more information may be pre-downloaded, since concerns about the "cost" of the extra data are reduced.

Figure 2:
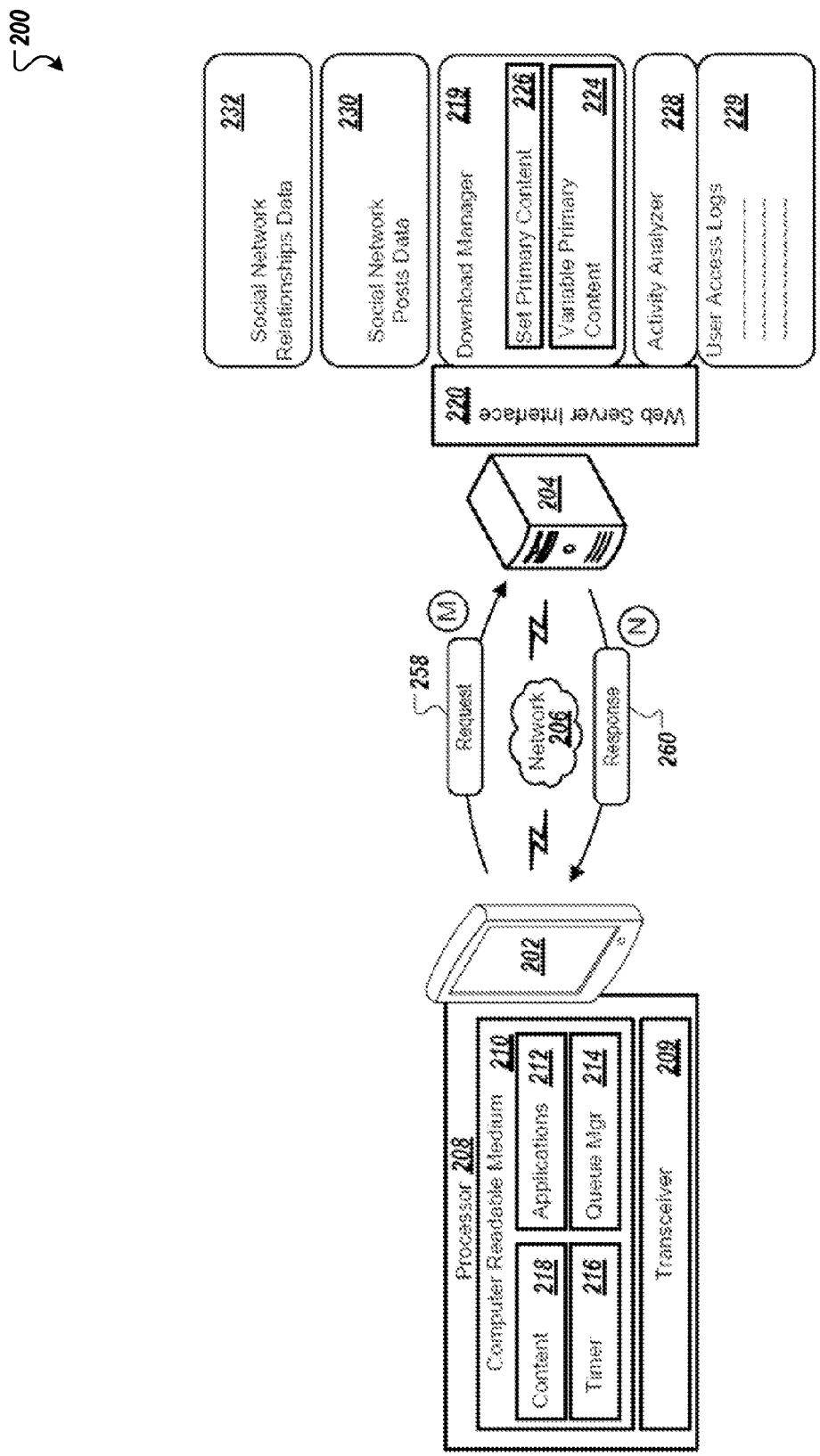
FIG. 2 is a diagram of an example system that may be used for transmitting and receiving data.

FIG. 2 is a diagram of an example system 200 that may be used for transmitting and receiving data. The system 200 includes a mobile device 202 that communicates with a server system 204 over a network 206. The network 206 may include a private network, such as an intranet, a public network, such as the Internet, or some combination thereof. The mobile device 202 includes one or more processors 208, a transceiver 209, and computer readable medium 210. The computer readable medium 210 includes one or more applications 212, a queue manager 214, a timer 216, and social network content 218.

The applications 212 may include, for example, a social networking application (which may be a stand-alone application or an application running in a web browser, for example) by which a user of the device 202 can manage social connections, see information about their social connections, post information and other content about themselves, and review posts by others, including people and other entities with which they have a defined acquaintance relationship on a social network. The content 218 includes posts and other content from one or more social networks of which the user of device 202 is a member. The content may be received and stored by a central operating system service on the device 202, which may be managed by queue manager 214. The queue manager may take care of requesting information from the various social networks, storing it, and making it available to various applications 212 on the device 202, including the social networking application.

The queue manager 214 may obtain information on its own initiative or in response to a request from an application. On its own initiative, the queue manager 214 may pre-download posts and other content from one or more social networking systems that are separate from each other, such as by the timer 216 periodically triggering the queue manager to make such a request. The queue manager's request may indicate that the device 202 wants "primary" content and the particular social networking systems may determine which content to provide. Alternatively, the queue manager 214 may identify particular types of content (e.g., posts from particular other people in the user's contact list, the user's profile information, and the like) and specifically request that type of content. Such a request 258 may be sent across the network 206, and may cause a response 260 to be produced that includes the requested content. The queue manager 214 may then cause such content 218 to be stored until it is actually requested by one of the applications 212.

Others of the requests 258 may be made in response to a specific request from one of the applications 212. For example, a user may request content when viewing a social networking application (e.g., by clicking an image thumbnail to see a full-size image) and the application may request such content from the queue manager 214. If the content has already been pre-downloaded as content 218 that is stored on the device 202, it may be provided immediately, but if the queue manager 214 determines that it includes content that has not yet been downloaded, it may separately request 258 the content that has not yet been downloaded.

The server system 204 may be a system that is operated by a social network provider, and the device 202 may in coordination access multiple different such systems. The server system includes a number of components, but the figure here focuses on components for permitting prioritized download of content from the system 204.

A web server interface 220 accepts requests such as request 258 from various devices that have been associated, via a log in process, with members of the social network. The interface also formats content that has been provided to such devices in responses such as response 260. The web server interface may take a variety of familiar forms.

A number of additional components may communicate with the interface 220 and with each other in order to respond to requests by providing, in appropriate circumstances, either primary or secondary content for members of the social network. For example, a download manager 219 may receive indications of a request and may determine which content, to which a user of device 202 may have access, should be downloaded at any given time. The download manager 219 may, for example, consider categories of primary content in response to certain types of requests, where the primary content has been determined to be content that a user will likely want to review first. As such, the download manager can associate to at least two types of primary content: set primary content 226 and variable primary content 224, and may gather such content for downloading through the web server interface 220 as appropriate. The set primary content may be categories that are pre-defined and do not change, such as content provided by an operator of the system 204 and content that is personal to the particular user (e.g., profile information for the user and profile information for the user). The variable primary content 224 may include content categories that change as a user interacts with the system 204. For example, the categories may include posts from several friends of the user, and the identities of the "primary" friends may change over time as the user accesses them each more or less frequently. Also, the variable primary content 224 may include status updates from online games that the user is playing on the system 204. Their status as being primary or not may thus change based on whether the user is identified as being an active player of each particular game (e.g., if they have interacted with the game in the past week).

An activity analyzer 228 may provide information to the download manager for updating the categories of content that are considered to be primary or secondary. For example, the activity manager 228 may identify which content a user reviews and may update lists of primary content (e.g., by listing all friends of a user whose content that user has accessed in the last N days). In certain circumstances, user access logs 229 may be kept for a defined period, and may be reviewed by the activity analyzer 228 in order to identify the relevance sort of activity by the user.

The just-described components may also rely on two broader stores of data. A social network posts data 230 data store may contain all of the content that various users have posted to the social networking site, including textual posts, photos, discussions, gaming sessions, and the like. The social network relationships data 232 may define the social graph for the social network in terms of which users are "related" to other users, and the types of relationships, such as bilateral friends, unilateral followers, and the like. The social network relationships data 232 may also include personal data about particular users, such as profile information, data that indicates services (e.g., in-line games) to which the user subscribes, and the like.

Thus, in operation of the system 200, the timer 216 may determine at a certain time that a pre-download of primary content is needed, e.g., so that the primary content can be ready for immediate review by a user or review even if the device 202 goes off-line for a period. A timer signal may be provided to the queue manager 214 which may make a request 258 of the system 204, where the request will indicate that it is a request only for primary content (or the request 258 may specify the particular categories of primary content where the queue manager 214 includes functionality for determining which content categories should be considered to be primary). The web server interface 220 may reformat the request and may pass information from it to the download manager 219, which in the meantime has received updated information from the activity analyzer 228 to identify which content categories are currently primary for the user of device 202. The download manager may acquire such content from the social network posts data 230, and send it back to the device 202 through a response 260 that is generated by the web server interface.

In this manner, the system 200 may pre-download prioritized content from the social networking system (and from multiple such systems) to the device 202, so that when a user of the device 202 accesses a one of the relevant applications 212, the user may be able to access such content as it is manager by the queue manager 214, without network latency, and even if the device 202 is not connected to a network. If the user requests secondary content, such content can be retrieved through another request to the system 204, and if the device 202 is not then connected to a network (of the device may determine that the device 202 is not connected to a network that has unlimited free bandwidth), the device 202 may indicate that the secondary content cannot be retrieved or may warn the user that the download may use up a large amount of bandwidth.

Figure 3:
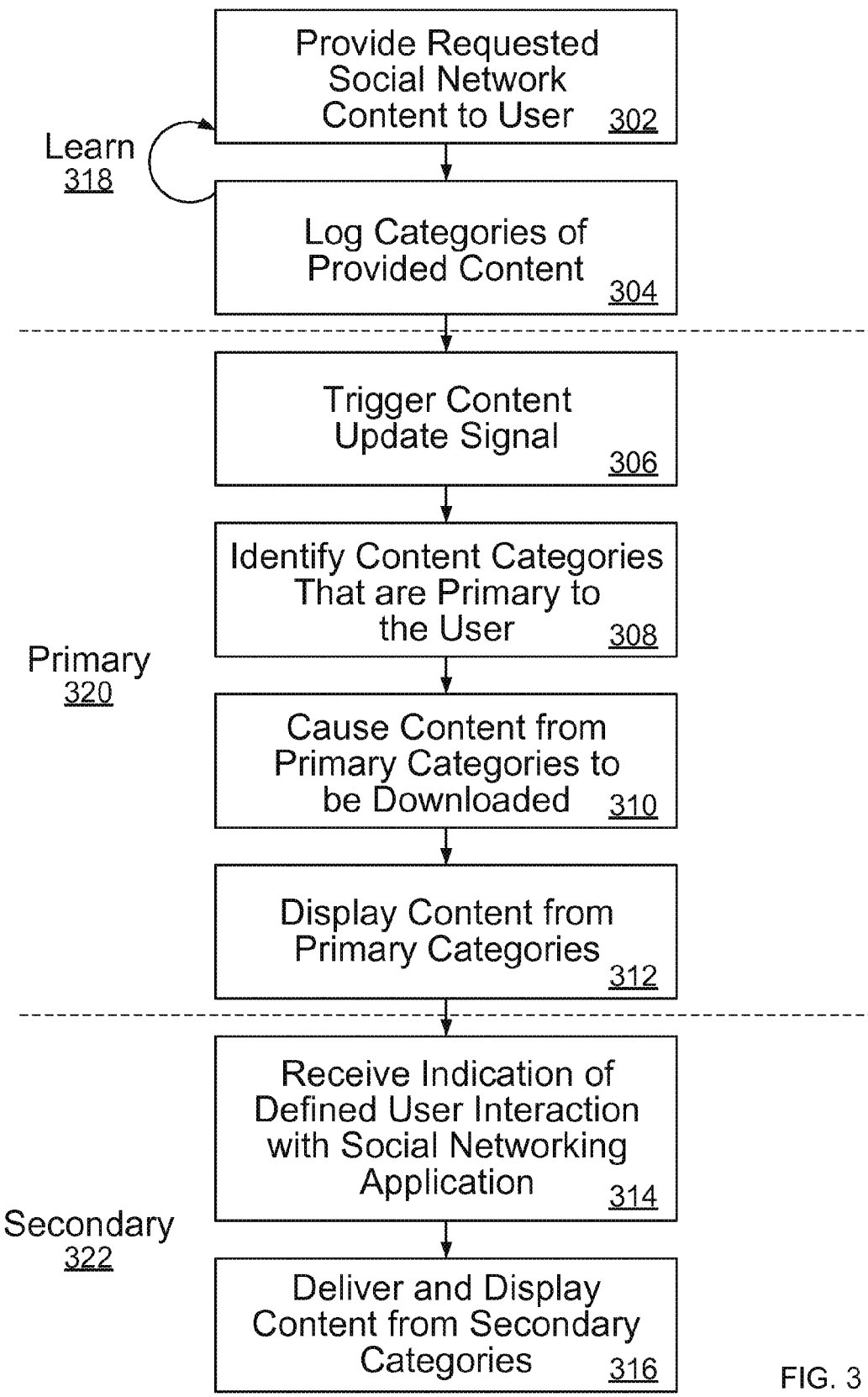
FIG. 3 is a flowchart of an example process for prioritized download of information from a social network.

FIG. 3 is a flowchart of an example process for prioritized download of information from a social network. In general, the process involves analyzing activity of a particular user at a social networking site to identify content at the site that is to be identified as being primary content for that user, or content that the user is likely to access more frequently in the future. Such content is then pre-downloaded to a device for the user without a need for a specific request by the user for such content. Other content may be downloaded only in response to a specific request for the content, though a reduced size version of such content may be pre-downloaded, such as by downloading a thumbnail of an image but waiting to download the larger image itself until a user makes a specific request for it. Such prioritized downloading of social network content may provide a balance for a user, in that the most frequently-accessed content may be ready for immediate review by the user without regular network latency, while not all content is downloaded so as to tax a battery on the user's device, or exhaust a data plan through which the user has a subscription with the data carrier.

The process shown here is generally divided into three different phases. A learning phase 318 represents times during which a user interacts with a social networking site, and the user's preferences are identified so as to further identify categories of content that should be considered primary content for the particular user (e.g., to make it a candidate for pre-downloading). A primary content phase 320 involves times during which primary content is being downloaded for the user, typically when a device is in a sleep mode or at other times when a user is not explicitly requesting the content. A secondary content phase 320 represents times at which a user has requested particular content that has not been pre-downloaded, so that the content must be obtained through a network from the social networking system in response to a user request.

Although the particular phases are shown as distinct here, the phases could also overlap, and be performed in iterative fashions. For example, a user may turn on a mobile device and immediately launch a social networking application and select content that has been determined to be secondary in character. In response to such selection, the secondary content may be downloaded for display to the user, as may additional secondary content, such as other content from a same user who posted the selected content, e.g., downloading a whole strip of photos when a user selects one photo in the strip. At substantially the same time, a routine may be run with the application to identify primary content that the user is likely to select in the near future, and such primary content may be automatically downloaded substantially in parallel with the selected secondary content. Also, such selections by the user may cause the system to further learn the user's preferences, and to update a roster of content that is determined to be primary or secondary. Thus, although typically a system will first learn preferences, and then automatically download primary content when a user is not interacting with a social network, the various phases may each be repeated over time and may overlap with each other in time.

The process in this example begins at box 302, where social networking content is provided to a user of a computing device. Such content may be provided in an automatically-displayed list of content through which the user may scroll in a familiar manner, such as recent posts and messages from friends on a social network. Other content may be specifically requested by the user, such as by the user clicking on a partial post to expand the post and read all of it, by the user clicking a link to an external site such as to watch a video whose link a friend has posted, or by clicking on a thumbnail image to view a larger-scale image and other images in a strip of images.

When the user makes such explicit selections of content, the process may log categories of the content that is provided in response to the explicit selections, as shown at box 304. For example, if user A clicks on a photo provided by user B, the system may record that user A made a content request of user B. Such logging information may be used to eventually identify user B as a primary contact of user A, so that content from user B is downloaded automatically to the device of user A in the future without an explicit request from user A.

At box 306, a content update signal is triggered. Such a signal may be triggered at periodic times when a user device is turned on, such as when the device is in sleep mode or a social networking application is not the focus of the device. The update signal may be generated by a service on the device, by a social networking application running in the foreground or background on the device, and/or by a server system that serves social network content.

At box 308, in response to the generation of the update signal, content categories that are primary to the user may be identified. For example, a smartphone may make a request for primary content from a social networking system without identifying what the primary content is. The social networking system may have previously determined, such as by the actions in boxes 302 and 304, what content in the social networking system is primary for the requesting user. Such content may then be downloaded by the social networking service to the smart phone, as shown at box 310. As one example, the system may identify N friends of the user whose content is most-frequently accessed by the user, and may automatically download all posts from the last X hours from the friend, or all posts by the friend since the prior update made by the user. Such content may be gathered for nodes or other items for other categories that are determined to be primary also, including, e.g., all messages for the operator of the social network, all new content on a profile for the first user, and the like.

At box 312, such content may be displayed on the smartphone or other device. Such display may occur on a "save" screen of the device or in a news feed, or may wait until the user activates a particular application for reviewing such content. For example, when a user first launches or turns focus to a social networking application on the device, the primary content may be shown to the user. Certain primary content may also be hidden, such as full-size images, and instead thumbnail images may be displayed, though a user selection of such thumbnail images may cause the full-size images to be displayed immediately to a user without network latency.

The user may then interact with such content, such as by scrolling through textual posts from other users and selecting links or thumbnail images from such posts. At box 314, an indication of a defined user interaction with the social networking application may be received. Such interaction may include, for example, selection of a control that requests secondary content that has not been preloaded or pre-downloaded to the user's device.

In such a situation, at box 316, content from one or more secondary categories may be delivered and downloaded to the device, and displayed on the device. For example, if a user selects content from a particular other user whose content they have not selected frequently or in a long time, that other user may be considered a secondary user vis-à-vis the first user. As a result, the content may need to be downloaded after it is explicitly requested by the first user. And if the first user selects content from the other user, all of the recently-posted content from that other user may also be downloaded, in an assumption that the first user will look at additional content from the other user once he or she has seen the most recent, selected content from the other user.

In this manner, then, a social networking application and a system on which the application is running, may present information that is determined to be commonly accessed by the user with very little latency, and may also display the information automatically, such as in an interleaved timeline of information and posts, or in association with other information such as electronic mails from a friend or friends.

Other information may take longer to display because it needs to be gathered at the time of request from a social networking system, but such delay should be minimal because it is secondary information that the user does not access very frequently in any event. As a result, a system may provide maximum usability for the vast bulk of information that a user requests while maintaining good battery life in a minimal cost to a network plans for a user of a device.

Figure 4:
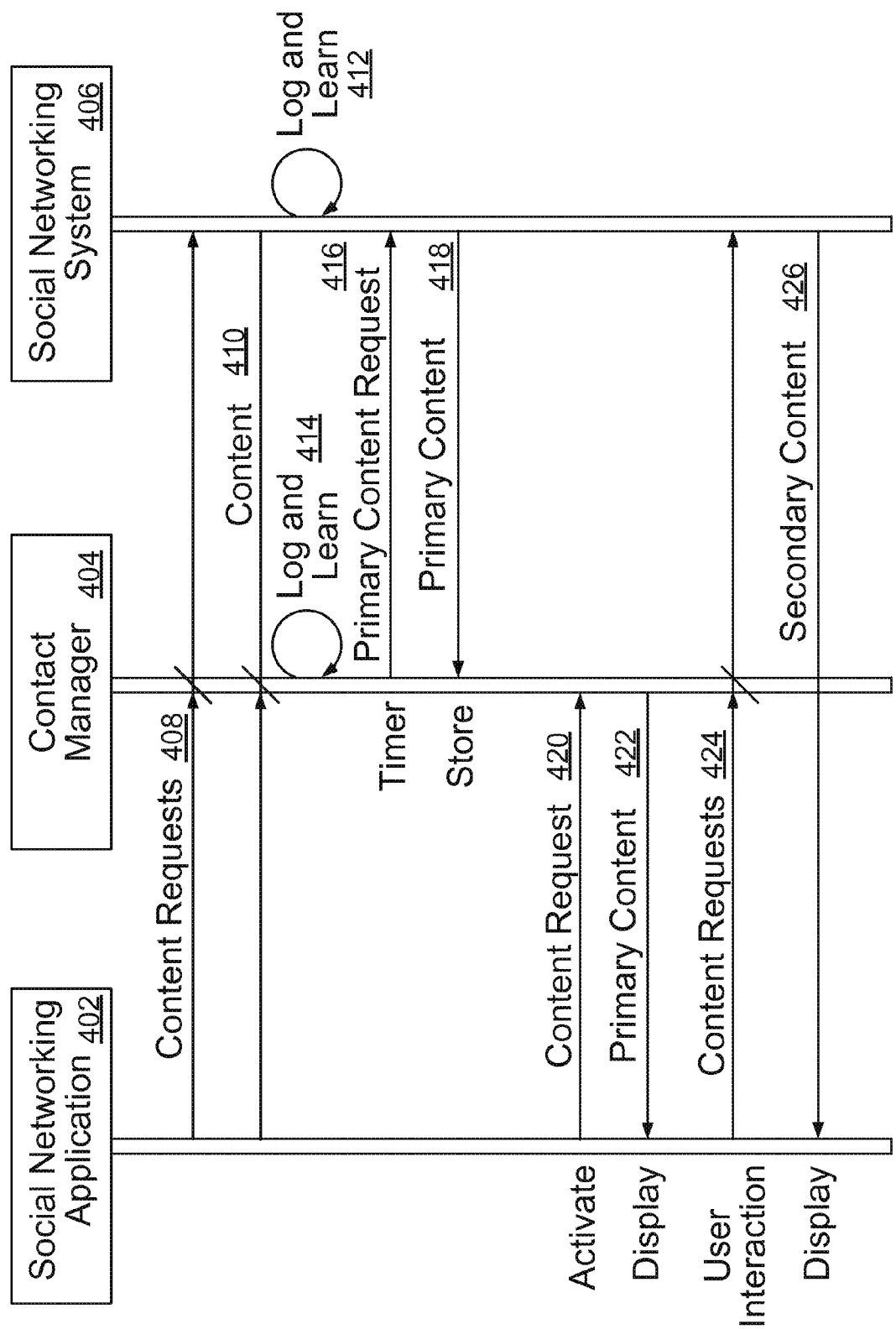
FIG. 4 is an activity diagram of a process for prioritized download of social networking content.

FIG. 4 is an activity diagram of a process for prioritized download of social networking content. In general, the process shown here is similar to the process shown in FIG. 3 above, though particular steps are shown as being performed by particular components of the system so as to provide one example that clearly shows where such operations may be performed in a system. However, other components may also be used to perform these or additional steps, and the particular components on which the steps are performed may vary, along with the order of the steps and the particular steps themselves.

The components in the system shown here are a social networking application 402 that executes on a computing device of a user, such as a smartphone or other mobile computing device for which preservation of battery life and data plan are relevant factors. A contact manager 404 may also execute on the portable device, and may take the form of a service provided by an operating system on the device to which various applications including the social networking application 402, may subscribe to obtain information, including information from various social networking systems. The contact manager 404, in this example, may manage information from a social network in the form of posts, and may also manage more traditional contact information, such as e-mail addresses, postal mail addresses, and telephone number information for contacts or friends of a user. A social networking system 406 may be a server-based system separate from and remote to the device, and may take a familiar form by which various users may establish relationships between and among each other, and may post information to the social networking system and have such information shared with their friends, or subgroups of their friends or other acquaintances.

In a first action, the social networking application 402 delivers content requests 408 to the social networking system 406, either directly or through the contact manager 404. Such content requests may involve the user choosing to see a list of posts from various friends in a chronological order, with posts from different friends to be interleaved in a chronological list with posts from other friends. Such a request may also include selections of portions of the various posts to obtain more detail, such as selections of links, image thumbnails, and the like. The social networking system 406 may then respond by delivering the content 410, either to the social networking application 402 directly, or through the contact manager 404. The selections and requests by the user may then be logged by the content manager 404 as shown by arrow 414, and/or by the social networking system 406, as shown by arrow 412. Such logging and analysis may enable the contact manager 404 or the social networking system 406 to identify categories of content that are primary for the user (i.e., categories that contain content that the user is likely to select in the future, based on past behavior), so that future downloads of content from those categories can be prioritized for the user.

At a later time, the contact manager 404, which may be implemented to have a timer to force periodic downloads of social networking information, may send a request 416 for primary content from the social networking system 406, and the social networking system 406 may respond by delivering the primary content at 418. The social networking system 406 may identify such primary content using rules developed at arrow 412, such as by tracking a top number of other users with whom, or with whose posts, the first user has interacted in the recent past. New posts from such users may thus be downloaded as part of the primary content 418.

At the time when such a request occurs, the social networking application 402 may not be executing, or may not be the focus of the user device (i.e., it may not be displayed and a place where user input will be directed). As a result, the contact manager 404 may store the primary content until such content is requested by the social networking application 402 or other applications that have access rights to such content.

At a later time, the social networking application 402 is activated, and as a result, it may automatically generate a content request 420 to the contact manager 404. Because the content request 420 is made automatically, it may simply request primary content, and so, at 422, the contact manager 404 returns the primary content to the social networking application 402, which display such content to the user. For example, the user may scroll through a list of posts made by their main friends who have been identified as their primary contacts by the social networking system 406, and whose posting content was thus pre-downloaded.

At some point, the user interacts with content that is not primary content, so that the contact manager 404 cannot simply return that content from the content it previously stored at 418. As a result, the contact manager 404 forwards the request to the social networking system 406, which returns the requested secondary content 426 to the social networking application 402. Such passage of content back to the social networking application 402 may be direct or may occur by passing it through the contact manager 404. The particular secondary content may be only the content explicitly requested by the user, and/or the particular secondary content may include additional nearby secondary content, such as additional digital images when a user requests a single digital image posted by another user.

Also, multiple social networking applications may make requests of content manager 404 at different times or substantially simultaneously. The contact manager 404 may itself return content that has been previously downloaded in the form of primary content, and may request additional content from the social networking system 406 if such requested content is secondary content. The contact manager 404 may also store the retrieved secondary content, so that if a subsequent application asks for such content, the contact manager 404 may return it without having to request it again from the social networking system 406.

Figure 5:
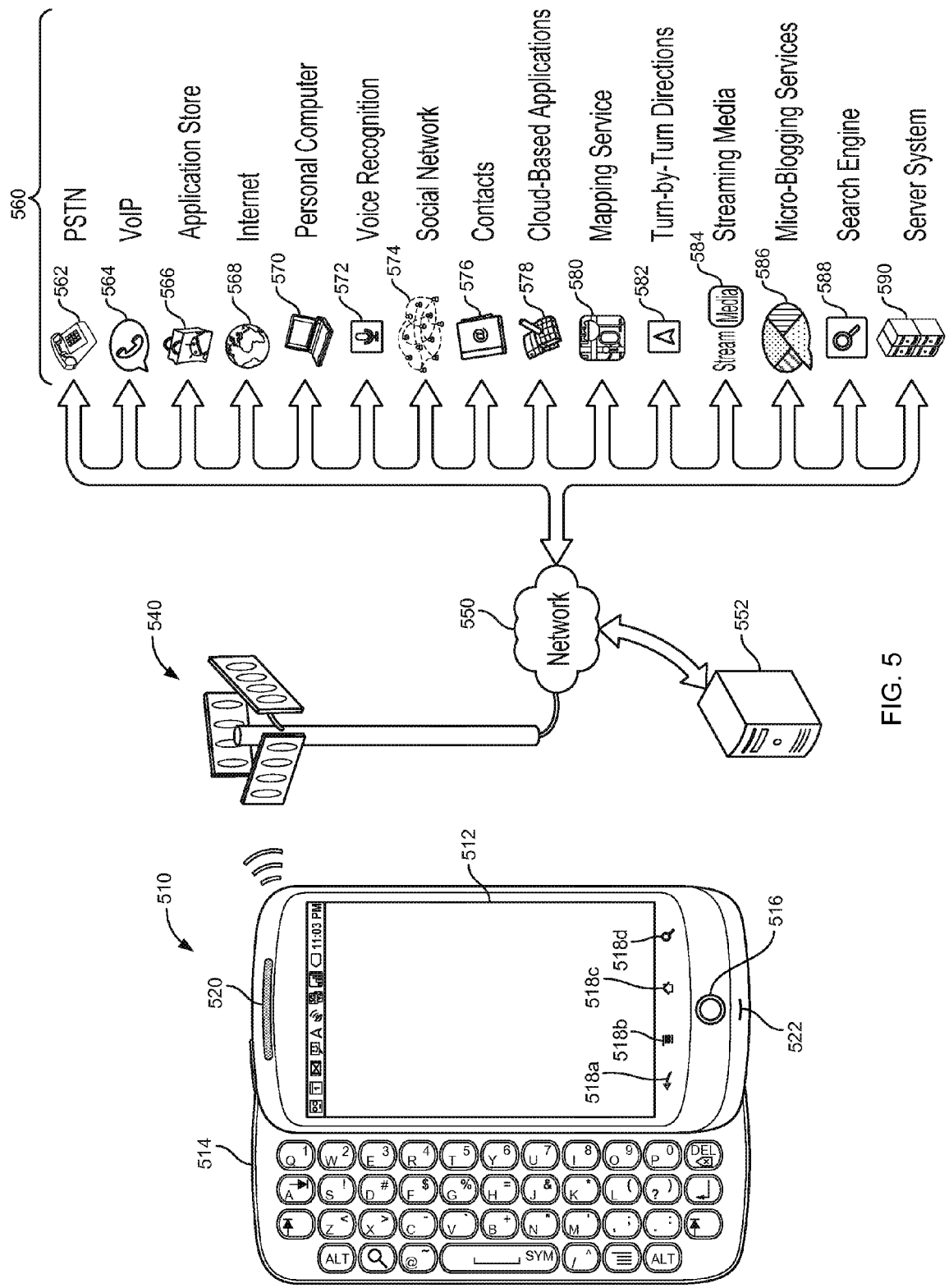
FIG. 5 is a conceptual diagram of a system that may be used to implement the systems and methods described in this document

Referring now to FIG. 5, a conceptual diagram of a system that may be used to implement the systems and methods described in this document is illustrated. Mobile computing device 510 can wirelessly communicate with base station 540, which can provide the mobile computing device wireless access to numerous services 560 through a network 550.

In this illustration, the mobile computing device 510 is depicted as a handheld mobile telephone (e.g., a smartphone or an application telephone) that includes a touchscreen display device 512 for presenting content to a user of the mobile computing device 510. The mobile computing device 510 includes various input devices (e.g., keyboard 514 and touchscreen display device 512) for receiving user-input that influences the operation of the mobile computing device 510. In further implementations, the mobile computing device 510 may be a laptop computer, a tablet computer, a personal digital assistant, an embedded system (e.g., a car navigation system), a desktop computer, or a computerized workstation.

The mobile computing device 510 may include various visual, auditory, and tactile user-output mechanisms. An example visual output mechanism is display device 512, which can visually display video, graphics, images, and text that combine to provide a visible user interface. For example, the display device 512 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 512). Further, the mobile computing device 510 may include one or more speakers 520 that convert an electrical signal into sound, for example, music, an audible alert, or voice of an individual in a telephone call.

An example mechanism for receiving user-input includes keyboard 514, which may be a full qwerty keyboard or a traditional keypad that includes keys for the digits '0-9', '*', and '#.' The keyboard 514 receives input when a user physically contacts or depresses a keyboard key. User manipulation of a trackball 516 or interaction with a trackpad enables the user to supply directional and rate of rotation information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

In some examples, the operating system provides a "desktop" user interface that is displayed upon turning on the mobile computing device 510, activating the mobile computing device 510 from a sleep state, upon "unlocking" the mobile computing device 510, or upon receiving user-selection of the "home" button 518*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 510 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 512 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 510 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 510 may include other application modules and hardware. A call handling unit may receive an indication of an incoming telephone call and provide a user capabilities to answer the incoming telephone call. A media player may allow a user to listen to music or play movies that are stored in local memory of the mobile computing device 510. The mobile telephone 510 may include a digital camera sensor, and corresponding image and video capture and editing software. An internet browser may enable the user to view content from a web page by typing in an addresses corresponding to the web page or selecting a link to the web page.

The mobile computing device 510 may include an antenna to wirelessly communicate information with the base station 540. The base station 540 may be one of many base stations in a collection of base stations (e.g., a mobile telephone cellular network) that enables the mobile computing device 510 to maintain communication with a network 550 as the mobile computing device is geographically moved. The computing device 510 may alternatively or additionally communicate with the network 550 through a Wi-Fi router or a wired connection (e.g., Ethernet, USB, or FIREWIRE). The computing device 510 may also wirelessly communicate with other computing devices using BLUETOOTH protocols, or may employ an ad-hoc wireless network.

A service provider that operates the network of base stations may connect the mobile computing device 510 to the network 550 to enable communication between the mobile computing device 510 and other computerized devices that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing devices associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call with a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

A voice recognition service 572 may receive voice communication data recorded with the mobile computing device's microphone 522, and translate the voice communication into corresponding textual data. In some examples, the translated text is provided to a search engine as a web query, and responsive search engine search results are transmitted to the mobile computing device 510.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program. Example cloud-based application programs include GOOGLE DOCS word processor and spreadsheet service, GOOGLE GMAIL webmail service, and PICASA picture manager.

Mapping service 580 can provide the mobile computing device 510 with street maps, route planning information, and satellite images. An example mapping service is GOOGLE MAPS. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program. Example services that provide streaming media include YOUTUBE and PANDORA.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 6:
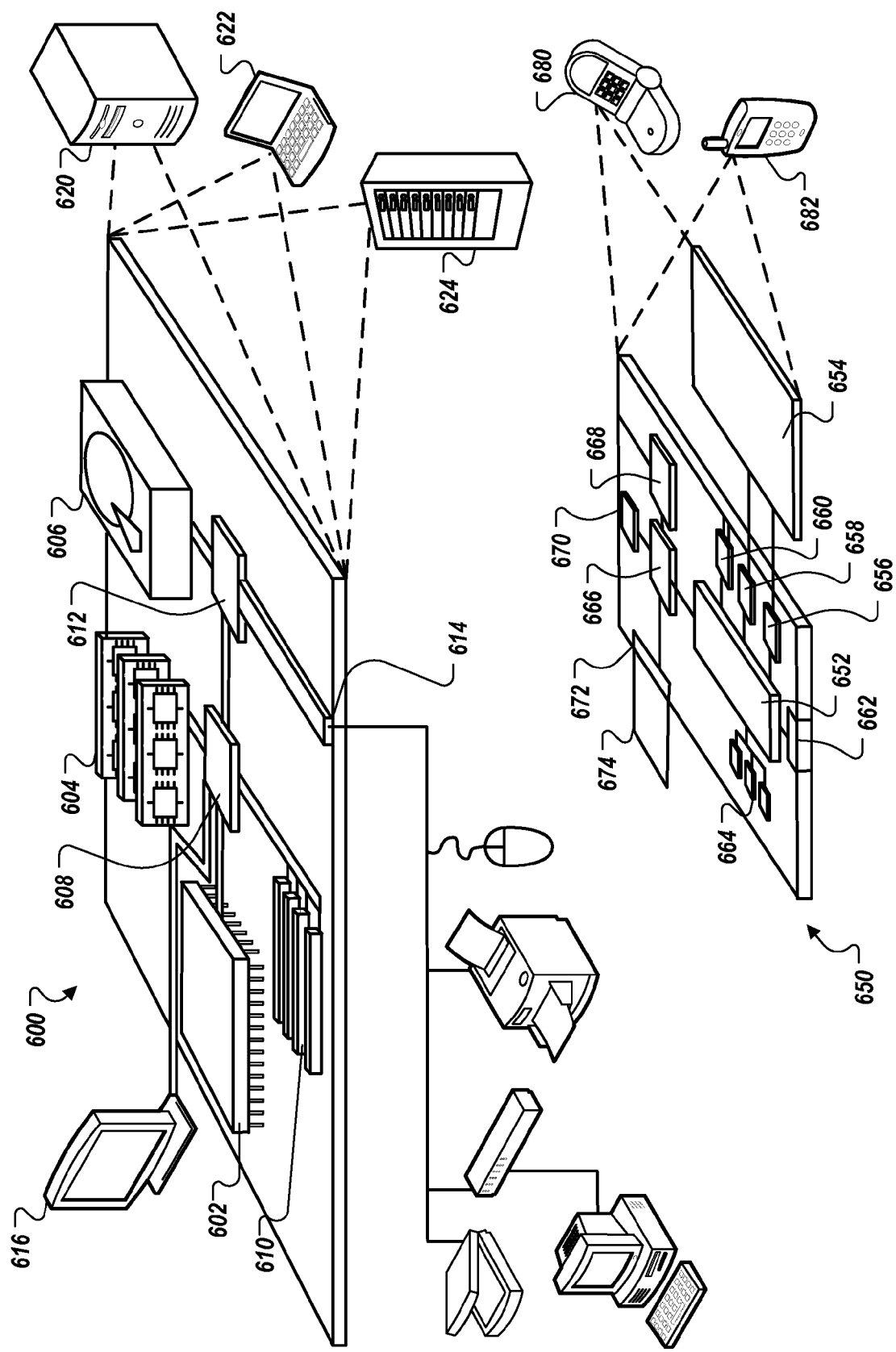
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives.

The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving, by a computing system, a request to deliver new content to a computing device that is associated with a user, the request being received without being in response to an explicit user request for the new content;
   analyzing, by the computing system, content in a social network system that was previously accessed by the user;
   identifying, by the computing system and based on the analysis of the content:
   (i) primary content sources that post content to the social network and whose content the user has accessed more than a threshold amount over a predefined period, and
   (ii) secondary content sources that post content to the social network and whose content the user has accessed less than the threshold amount over the predefined period, wherein the primary content sources are different from the secondary content sources;

identifying, by the computing system, content that was recently submitted to the social network by the primary content sources, wherein the content that was recently submitted to the social network by the primary content sources is accessible to the user; and causing, by the computing system and prior to the user requesting to view the identified content, the content that was recently submitted to the social network by the primary content sources to be downloaded from the social network system to the computing device automatically and without user interaction that requests the identified content, without causing content that was from secondary content sources to also be downloaded automatically.

2. The computer-implemented method of claim 1, wherein the identifying of content that was recently submitted to the social network by the primary content sources is performed by a service of an operating system on the computing device and made accessible to multiple applications on the computing device.

3. The computer-implemented method of claim 2, further comprising receiving a request for content from an application executing on the computing device and provided the requested content to the requesting application.

4. The computer-implemented method of claim 1, wherein the identifying of content that was recently submitted to the social network by the primary content sources is performed by the social networking system on a predefined schedule.

5. The computer-implemented method of claim 1, wherein content from primary content sources comprise two or more types selected from the group consisting of:

content posted to an area of the social networking system dedicated to the user, content posted to an area of the social networking system identified by the user as a favorite area, content posted by other users of the social networking system from whom the user has accessed content frequently, content posted by other users of the social networking system that the user has accessed recently, content posted by other users who the user has identified as being in a high-priority subset of contacts of the user on the social networking system, content posted by other users who are identified as favorites in one or more address books for the computing device, content posted by other users who are contacted frequently using the computing device, content posted by other users who are contacted frequently using the one or more address books for the computing device, and content posted by other users who are identified in a call log for the computing device.

6. The computer-implemented method of claim 1, further comprising causing reduced-size versions of content from the secondary content sources to be downloaded from the social networking system to the computing device automatically and without user interaction with a social networking application; and then causing larger-sized versions of the same content to be downloaded from the social networking system to the computing device in response to a defined user interaction with a social networking application that corresponds to the social networking system.

7. The computer-implemented method of claim 6, wherein the reduced-sized versions comprise image thumbnails and the larger-sized versions comprise full-size images.

8. The computer-implemented method of claim 6, wherein the defined user interaction comprises an explicit user request for a piece of non-preferred content.

9. The computer-implemented method of claim 1, wherein the identifying of content that was recently submitted to the social network by the primary content sources is performed upon determining that a predetermined period of time has elapsed since a previous process of identifying has occurred.

10. A computer-implemented method comprising:

analyzing, by a computer system, content in a social network system that was previously accessed by a user;

identifying, by the computer system, primary content from a social networking system, as compared to secondary content from the social networking system, wherein the primary content includes content from members of the social networking system whose content the user has accessed at least once within a predefined period and the secondary content includes content from members of the social networking system whose content the user has not accessed within the predefined period;

prior to the user requesting to view content from the social networking system, identifying, by the computer system, primary content that was recently submitted to the social networking system that the user has not yet accessed;

causing the identified primary content to be downloaded from the social networking system to the computing device automatically and without user interaction with a social networking application that is arranged to display the downloaded content; and causing secondary content to be downloaded from the social networking system to the computing device separately from the primary content, and in response to a defined user interaction with a social networking application that corresponds to the social networking system.

11. The computer-implemented method of claim 10, wherein the identifying of primary content and secondary content is performed by a service of an operating system on the computing device that also makes the primary and secondary content available to multiple applications on the computing device.

12. The computer-implemented method of claim 11, further comprising receiving a request for secondary content from an application executing on the computing device and providing the requested secondary content to the requesting application.

13. The computer-implemented method of claim 10, wherein the identifying of primary content and secondary content is performed by the social networking system and on a predefined schedule.

14. The computer-implemented method of claim 10, wherein the primary content includes two or more categories selected from the group consisting of:

content posted to an area of the social networking system dedicated to the user, content posted to an area of the social networking system identified by the user as a favorite area, content posted by other users of the social networking system from whom the user has accessed content frequently, content posted by other users of the social networking system that the user has accessed recently, content posted by users that the user has identified as being in a high-priority subset of contacts of the user on the social networking system, content posted by other users who are identified as favorites in one or more address books for the computing device, content posted by other users who are contacted frequently using the computing device, content posted by other users who are contacted frequently using the one or more address books for the computing device, and content posted by other users who are identified in a call log for the computing device.

15. The computer-implemented method of claim 10, further comprising causing reduced-size versions of secondary content to be downloaded from the social networking system to the computing device automatically and without user interaction with a social networking application on the computing device; and then causing larger-sized versions of the same content to be downloaded from the social networking system to the computing device in response to a defined user interaction with a social networking application that corresponds to the social networking system.

16. The computer-implemented method of claim 15, wherein the reduced-sized versions comprise image thumbnails and the larger-sized versions comprise full-size images.

17. The computer-implemented method of claim 15, wherein the defined user interaction comprises an explicit user request for a piece of secondary content.

18. The computer-implemented method of claim 10, wherein the identifying of primary content and secondary content is performed upon determining that a predetermined period of time has elapsed since a previous process of identifying has occurred.

19. The computer-implemented method of claim 10, further comprising analyzing prior requests for content by the user to identify the primary content and the secondary content.

20. A computer-implemented system comprising:
   a social network activity analyzer arranged to:
      analyze content in a social network that was previously accessed by a user; and
      identify, based on the analyzed content, (i) primary content sources that post content to the social network and whose content the user has accessed more than a threshold amount of time over a predefined period, and (ii) secondary content sources that post content to the social network and whose content the user has accessed less than the threshold amount over the predefined period, wherein the primary content sources are different from the secondary content sources;
   one or more electronic storage media storing data that represents posts in the social network made by users of the social network, including posts that are available to the first user; and
   a download manager programmed to:
      identify content that was recently submitted to the social network by the primary content sources, wherein the content that was recently submitted to the social network is accessible to the user; and
      automatically cause download to a user computing device of content, prior to the first user requesting to view the identified content from the social network and without explicit user request for the identified content, the identified content that was recently submitted to the social network by the primary content sources, separately from content from secondary content sources.

21. The computer-implemented system of claim 20, wherein the download manager is further programmed to automatically cause download of content from secondary content sources, in response to an explicit user request for the content from the secondary content sources.

22. The computer implemented system of claim 20, further comprising one or more activity logs storing information that indicates types of content previously requested by the first user.

23. The computer-implemented system of claim 20, wherein the social network activity analyzer and the download manager are implemented on a computer server system that is located remotely from the user computing device.

* * * * *